UNITED STATES PATENT OFFICE.

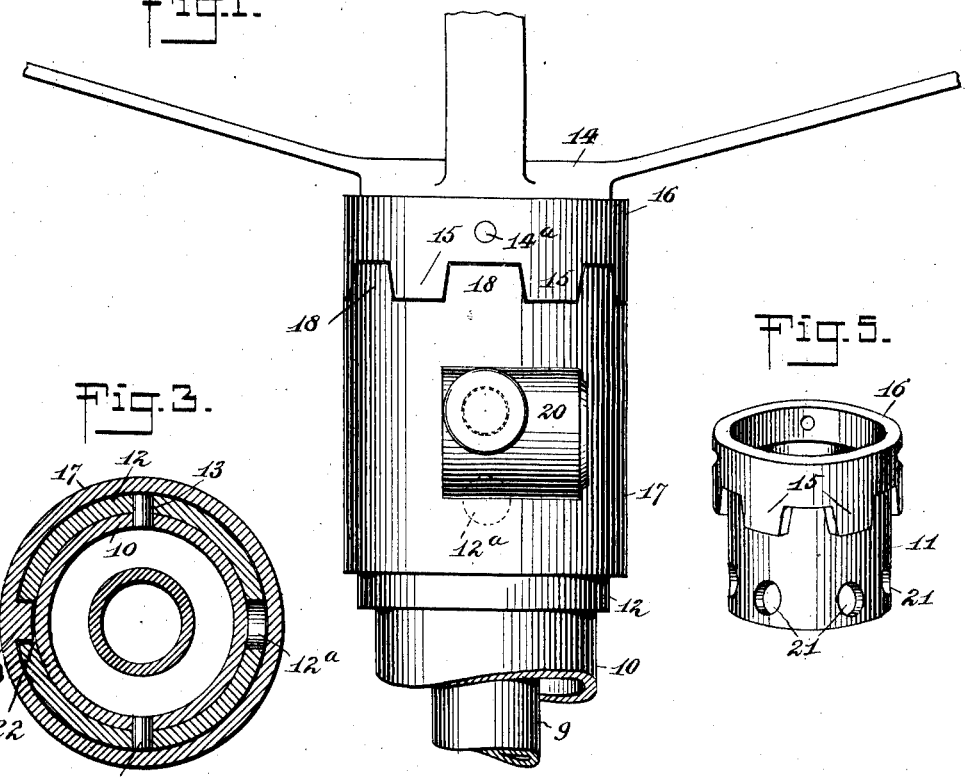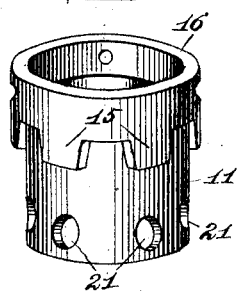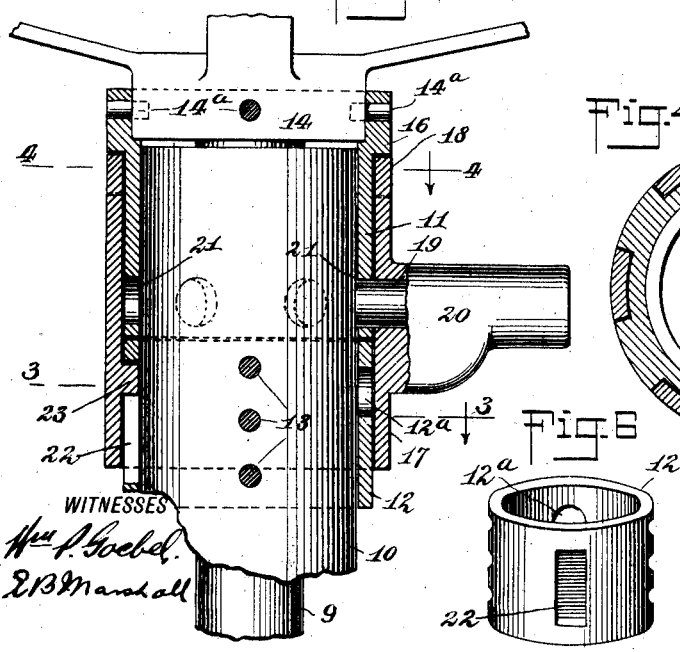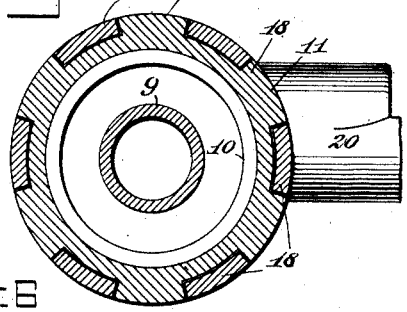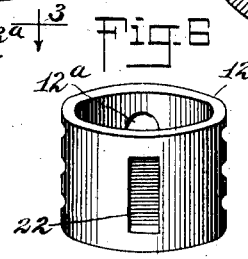

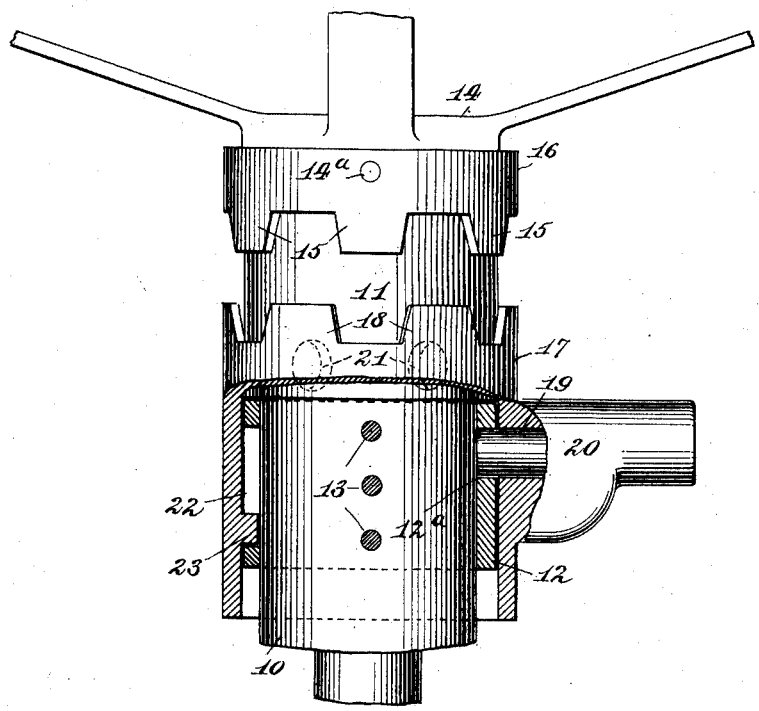

RUSSELL T. BINDER, OF ORANGE, NEW JERSEY, ASSIGNOR TO RUSSELL SALES CO., OF ESSEX COUNTY, NEW JERSEY, A CORPORATION OF NEW JERSEY.

STEERING-WHEEL LOCK.

1,390,952.  Specification of Letters Patent.  Patented Sept. 13, 1921.

Application filed August 11, 1919. Serial No. 316,830.

*To all whom it may concern:*

Be known that I, RUSSELL T. BINDER, a citizen of the United States, and a resident of Orange, in the county of Essex and State of New Jersey, have invented a new and Improved Steering-Wheel Lock, of which the following is a full, clear, and exact description.

My invention has for its object to provide an improved steering wheel lock which will enable the user to lock the steering wheel against rotation and against removal and make it impossible to readily free the locked parts.

Still other objects of the invention will appear in the following specification in which the preferred construction is set forth.

In the drawings the same reference characters refer to similar parts in all the views, and in which—

Figure 1 is a view showing my invention in elevation;

Fig. 2 is a vertical sectional view of Fig. 1;

Fig. 3 is a sectional view on the line 3—3 of Fig. 2;

Fig. 4 is a sectional view on the line 4—4 of Fig. 2;

Fig. 5 is a perspective view of the upper of the inner sleeves;

Fig. 6 is a perspective view of the lower of the inner sleeves;

Fig. 7 is a sectional view illustrating the invention locked in inoperative position.

By referring to the drawings, it will be seen that on the steering post 9 there is a sleeve 10 on which are mounted two sleeves 11 and 12, the sleeve 11 being disposed above the sleeve 12, and the sleeve 12 being secured to the sleeve 10 by means of bolts or rivets 13. To the upper sleeve 11 there is secured the hub 14 of a steering wheel by means of rivets 14$^a$. As is best shown in Figs. 1 to 5, the upper sleeve 11 has teeth 15 which depend from a shoulder 16 at the top of the sleeve 11. Disposed around the sleeves 11 and 12, there is a fourth sleeve 17 which has teeth 18 projecting upwardly for meshing with the teeth 15, the sleeve 17 being locked to the sleeve 11, and thereby secured to the hub 14 of the steering wheel when the said teeth 18 and 15 are in mesh.

As a means for holding the sleeve 17 in position with its teeth 18 in mesh with the teeth 15, I provide the sleeve 17 with a bolt 19 which is disposed in a casing 20 having a suitable locking means, this bolt 19 being provided for disposal in one of the orifices 21 in the sleeve 11. By this means the sleeve 17 is locked to the steering wheel hub 14. The lower sleeve 12 has a vertical slot 22 in which is disposed a pin or stud 23 on the sleeve 17.

The sleeve 10 is secured against rotation relatively to the vehicle and when the parts are locked in the position shown in Figs. 1 and 2, it is impossible to rotate or rock the steering wheel hub 14, because the steering wheel hub 14 is secured against rotation relatively to the sleeve 11 by the rivets 14$^a$; the sleeve 11 is locked to the sleeve 17 by the bolt 19; the sleeve 17 is locked against rotation relatively to the sleeve 12 by the pin 23 and the slot 22; and the sleeve 12 is secured to the sleeve 10 by the rivets 13.

As has been stated, the sleeve 10 is secured against rotation relatively to the vehicle by any suitable means.

When it is desired to free the steering wheel, the bolt 19 is removed from the orifice 21, and the sleeve 17 is slid down on the sleeves 11 and 12. The bolt 19 may then be slid into the orifice 12$^a$ in the sleeve 12 to hold the sleeve down. The steering wheel hub is secured to the steering post 9 by any suitable means.

Having thus described my invention, I claim as new and desire to secure by Letters Patent:

1. In a steering wheel lock, a sleeve adapted to be secured to a vehicle, a second sleeve mounted on the first sleeve, a third sleeve mounted on the first sleeve below the second sleeve, there being an orifice in the second sleeve, teeth on the second sleeve, a steering wheel secured to the second sleeve, the third sleeve being secured to the first sleeve, a fourth sleeve disposed around the second and third sleeves and having teeth for engaging the first mentioned teeth, a pin and slot connection between the third sleeve and the fourth sleeve, and a bolt on the fourth sleeve for insertion in the orifice.

2. In a steering wheel lock, a sleeve, a sleeve mounted on the first sleeve and having teeth and an orifice, a steering wheel hub secured to the second sleeve, a third sleeve disposed around the second sleeve and having teeth for meshing with the teeth on the second sleeve, a bolt on the third sleeve for disposal in the orifice of the second sleeve, and means connecting the first and third sleeves which permits a longitudinal movement of the third sleeve relatively to the first sleeve while preventing the rotation of the third sleeve relatively to the first sleeve.

3. In a steering wheel lock, a sleeve, a second sleeve mounted on the first sleeve, a third sleeve mounted on the first sleeve below the second sleeve, the second sleeve being provided with teeth, a steering wheel hub secured to the second sleeve, the third sleeve being secured to the first sleeve, a fourth sleeve disposed around the first-mentioned sleeves and having teeth for engaging the first-mentioned teeth, a pin and slot connection between the third and the fourth sleeves, and means free from the teeth for locking the fourth sleeve to the second sleeve and with the teeth in mesh.

4. In a steering wheel lock, a sleeve, a second sleeve mounted on the first sleeve and being provided with teeth, a steering wheel hub secured to the second sleeve, a third sleeve disposed around the second sleeve and provided with teeth for meshing with the first-mentioned teeth, a means connecting the first and third sleeves which permits a longitudinal movement of the third sleeve relatively to the first sleeve while preventing the rotation of the third sleeve relatively to the first sleeve, and means free from the teeth for locking the third sleeve to the second sleeve with the teeth in mesh.

5. In a steering wheel lock, a sleeve adapted to be secured to a vehicle, a second sleeve mounted on the first sleeve, a third sleeve mounted on the first sleeve below the second sleeve, there being a radial orifice in the second sleeve, teeth on the second sleeve, a steering wheel secured to the second sleeve, the third sleeve being secured to the first sleeve, a fourth sleeve disposed around the second and third sleeves and having teeth for engaging the first mentioned teeth, a pin and slot connection between the third sleeve and the fourth sleeve, and a radially disposed bolt on the fourth sleeve for insertion in the orifice.

6. In a steering wheel lock, a sleeve adapted to be secured to a vehicle, a second sleeve mounted on the first sleeve, a third sleeve mounted on the first sleeve below the second sleeve, there being radial orifices in the second and third sleeves, teeth on the second sleeve, a steering wheel secured to the second sleeve, the third sleeve being secured to the first sleeve, and a fourth sleeve disposed around the second and third sleeves and having teeth for engaging the first mentioned teeth, a pin and slot connection between the third and fourth sleeves, and a bolt on the fourth sleeve for insertion in the orifices.

7. In a steering wheel lock, a sleeve, a second sleeve mounted on the first sleeve and being provided with teeth, a third sleeve disposed around the first sleeve and being provided with teeth for meshing with the first teeth, means connecting the first and third sleeves which permits a longitudinal movement of the third sleeve relatively to the first sleeve while preventing the rotation of the third sleeve relatively to the first sleeve, a steering wheel hub secured to the second sleeve, there being orifices in the second sleeve and in the said means and a bolt on the third sleeve for insertion in the orifices.

8. In a steering wheel lock, a sleeve adapted to be disposed on a second sleeve mounted on a steering column and to be secured to a steering wheel, teeth on the first sleeve, a third sleeve adapted to be secured to the second sleeve, a fourth sleeve mounted on the first and third sleeves and provided with teeth for engaging the first teeth, a pin and slot connection between the third and fourth sleeves, and means free from the teeth to lock the fourth sleeve to the first sleeve.

9. In a steering wheel lock, a sleeve adapted to be secured to a vehicle, a second sleeve mounted on the first sleeve, a third sleeve mounted on the first sleeve below the second sleeve, teeth on the second sleeve, a steering wheel secured to the second sleeve, the third sleeve being secured to the first sleeve, a fourth sleeve disposed around the second and third sleeves and having teeth for engaging the first mentioned teeth, locking means for securing the fourth sleeve to the second sleeve and a pin and slot free from the said locking means and connecting the third sleeve and the fourth sleeve.

10. In a steering wheel lock, a sleeve, a sleeve mounted on the first sleeve and having teeth, a steering wheel hub secured to the second sleeve, a third sleeve disposed around the second sleeve and having teeth for meshing with the teeth on the second sleeve, locking means for securing the third sleeve to the second sleeve, means free from the said locking means and connecting the first and third sleeves which permits a longitudinal movement of the third sleeve relatively to the first sleeve while preventing the rotation of the third sleeve relatively to the first sleeve.

11. In a steering wheel lock, a sleeve adapted to be secured to a vehicle, a second sleeve mounted on the first sleeve, a third sleeve mounted on the first sleeve below the second sleeve, teeth on the second sleeve, a steering wheel secured to the second sleeve, the third sleeve being secured to the first sleeve, a fourth sleeve disposed around the second and third sleeves and having teeth for engaging the first mentioned teeth, locking means for securing the fourth sleeve to the second and third sleeves at the will of the operator, and a pin and slot free from the said locking means and connecting the third and fourth sleeves.

RUSSELL T. BINDER.

Witnesses:
    JOHN KALLOP,
    H. S. McILVAIN.